Figure 1:
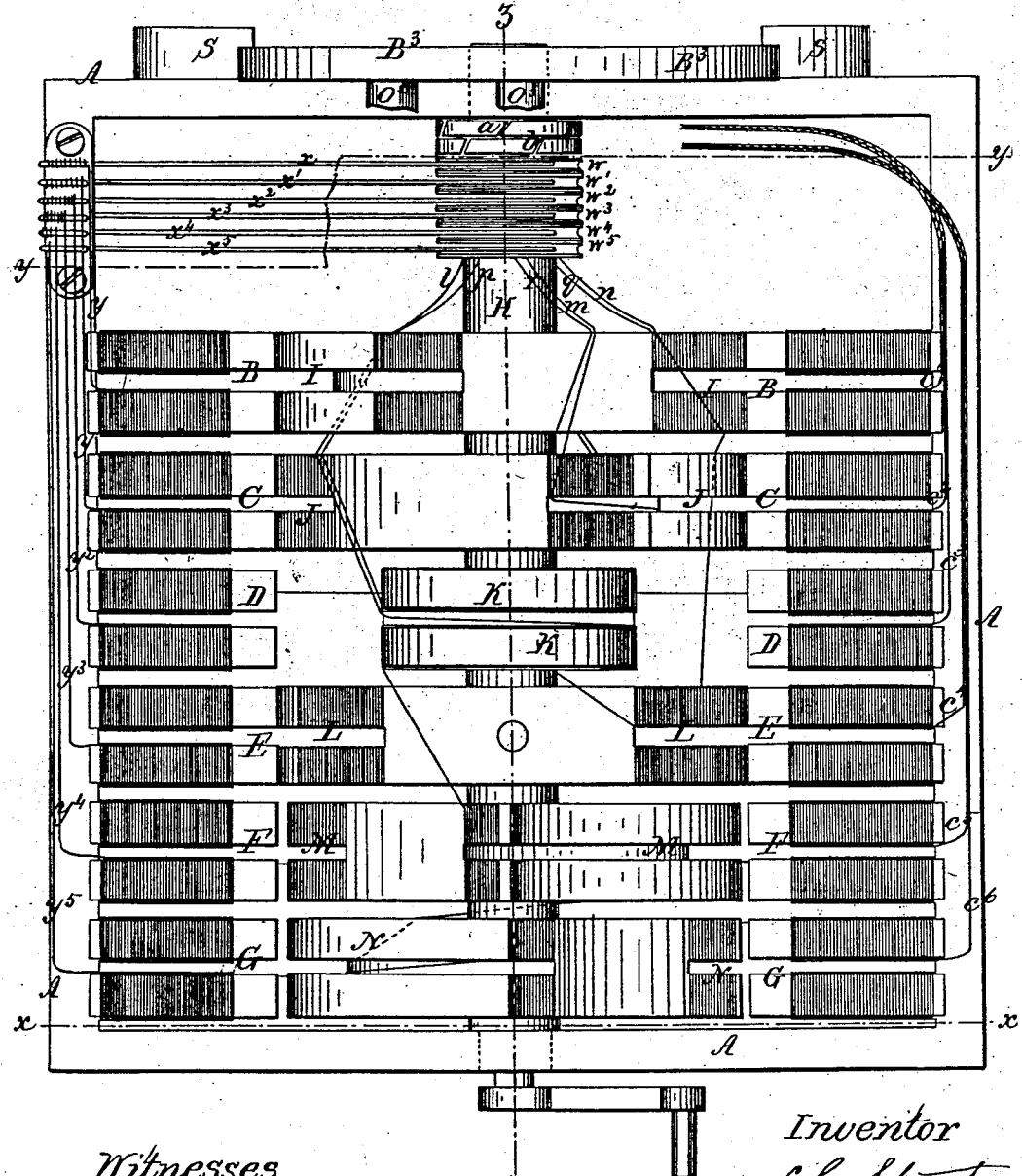

L. C. STUART.
Magnetic Engine.

No. 78,619. Patented June 2, 1868.

3 Sheets—Sheet 1.

Witnesses

Inventor
L. C. Stuart

L. C. STUART.
Magnetic Engine.
3 Sheets—Sheet 2.
No. 78,619.
Patented June 2, 1868.
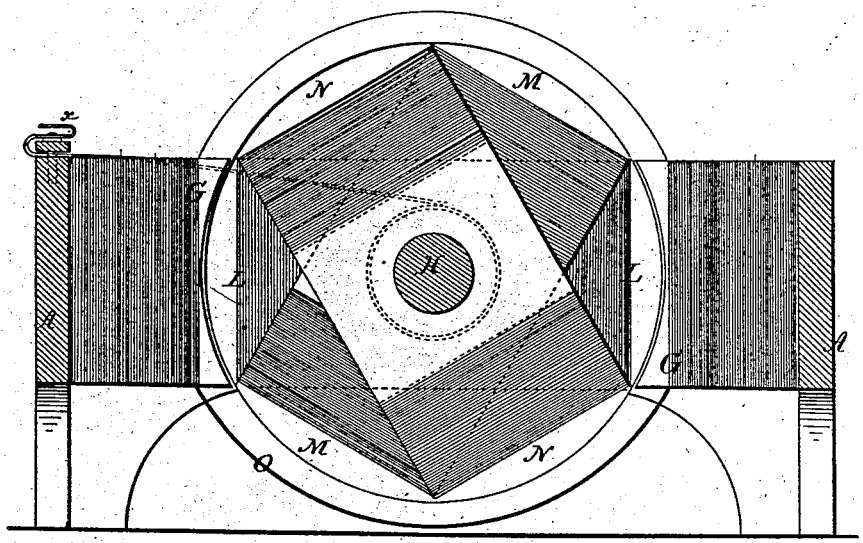
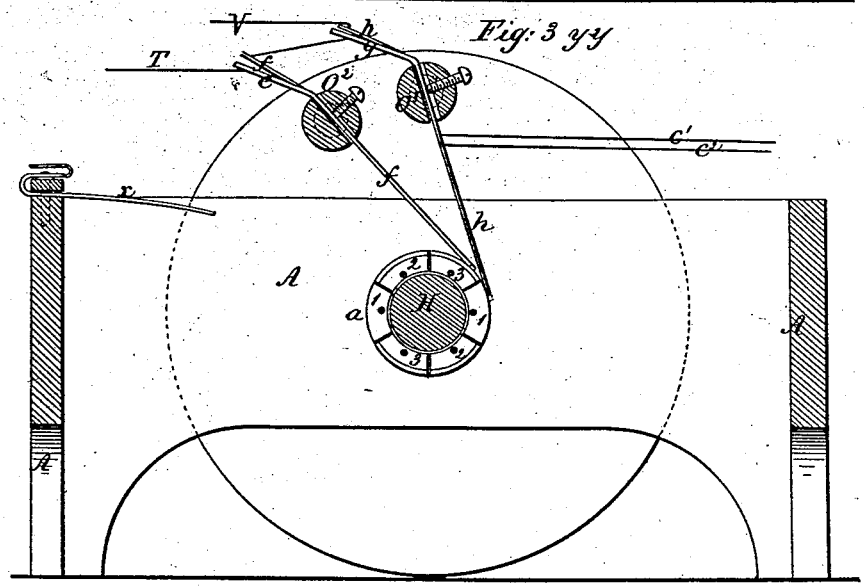
Witnesses
Inventor L. C. STUART.
Magnetic Engine.
No. 78,619.
3 Sheets—Sheet 3.
Patented June 2, 1868.
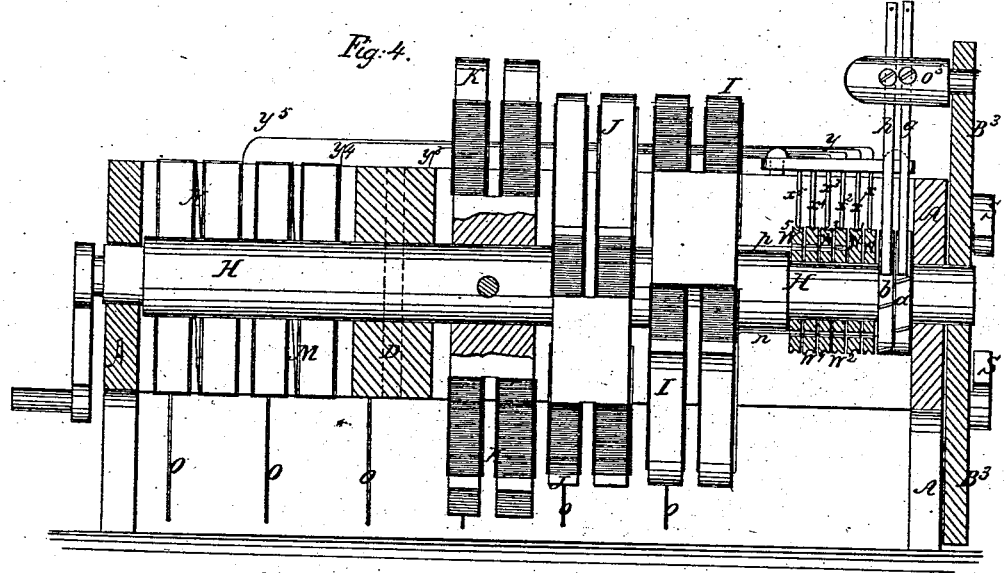
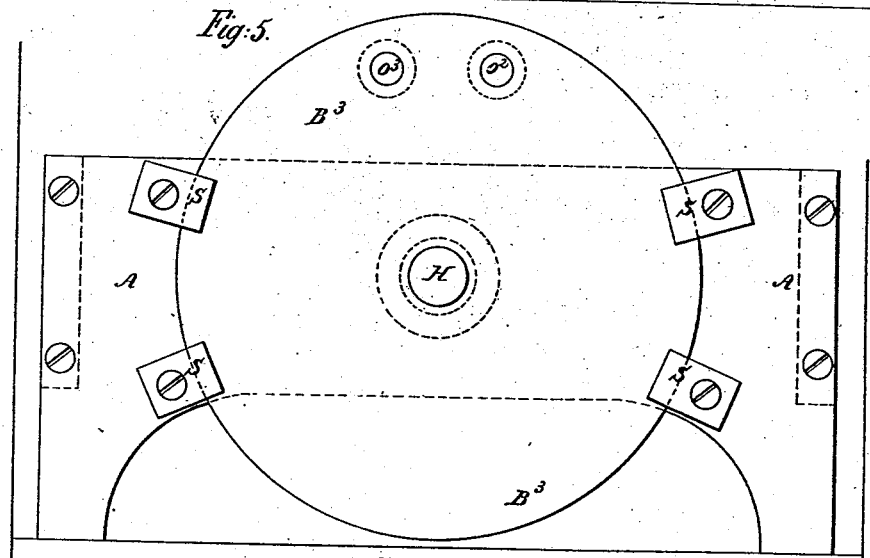
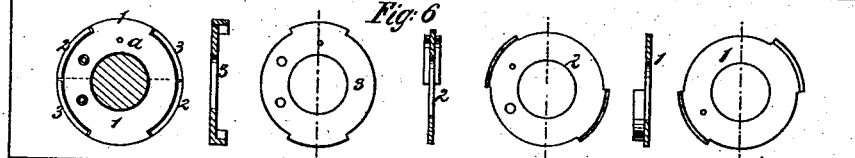
Witnesses:
Inventor:

UNITED STATES PATENT OFFICE.

L. C. STUART, OF NEW YORK, N. Y.

IMPROVEMENT IN ELECTRO-MAGNETIC ENGINES.

Specification forming part of Letters Patent No. 78,619, dated June 2, 1868.

*To all whom it may concern:*

Be it known that I, L. C. STUART, of New York, New York county, in the State of New York, have invented a certain new and useful Improved Magnetic Engine; and I do hereby declare that the following is a full and exact description thereof, reference being had to the accompanying drawings, making part of this application.

My invention relates to the obtaining of motive power from electricity, and has for its main object to produce a practically successful machine, by means of which electricity may be utilized and employed as an economic and reliable motor for driving machinery, &c., as will be hereinafter more fully explained.

Previous to my invention it has been well known that the attractive force of magnets is very great, although this force dimishes in a very rapid ratio as their surfaces are moved away from each other, and also that the sum of attractive force exerted by magnets during the act of coming together is the same whether the magnets approach each other directly or swing tangentially or at an angle toward each other. It has also been well known that if a stationary and movable magnet of opposite polarity be arranged so that the opposite outer edges of their poles are about opposite and they be energized by a current of electricity the movable magnet will at once swing or vibrate on its center of motion until it comes to a central position—that is, with its entire pole immediately opposite to the entire pole of the stationary magnet—and it is well known that the force or tendency with which the vibratory magnet moves is greatest when the opposite outer edges of their poles are nearly in contact and decreases as it assumes this central position or moves to bring its pole all opposite to the pole of the stationary magnet, and magnetic engines have been constructed upon these known principles, consisting of movable or vibrating (or rotatory) magnets brought successively into operation, so as to induce motion in the machine by a series of magnetic impulses. Since, however, the power of a movable magnet (its pole moving on a tangential line in close proximity to the opposite pole of a stationary magnet) decreases as it approaches its central position or dead-center, and at that point both magnets tend to prevent any further motion of the movable magnet, it follows that in order to maintain continued motion with perpetual draft it is necessary to employ several series of magnets and to demagnetize each series by the time the movable magnets arrive at their dead-center, in order that they may freely pass,-and since some portion of magnetic power remains in the iron for a short time after the electric current is taken away it is necessary, in order that the movable magnets may freely move past their dead-center, that the electric current be cut off before the movable magnets reach their central position, and it is therefore desirable to employ several series of magnets and to transfer the magnetic current from one series of magnets to another in such a manner or at such times that each series of magnets will in succession each operate only during the time or positions in which their magnetic influence will be most efficacious in inducing to a continuous and reliable movement of the whole of the series of magnets and their attendant machinery, and to carry out this principle or mode of operation in a successful manner is the object of the first part of my invention, which consists in the employment of several series of rotatory electro-magnets arranged to move in close proximity to several series of stationary electro-magnets in pairs, into which the electric current is alternately introduced and cut off in such manner that each double pair or series of moving and stationary magnets shall operate only at the time when their magnetic force can be rendered fully available, as will be more fully explained hereinafter.

Previous to my invention it has been well known that when communication between the poles of a battery is broken a spark is produced at the point where contact is broken, a particle of metal is burned at that point, (at each interruption of the current,) and in the event of the use of a battery of sufficient capacity or strength a blaze of fire induced and the melting of the metallic conductor effected; and it is also well known that when communication between the poles of a battery is interrupted chemical action in the battery nearly ceases, and that the full power of the battery cannot be instantly obtained on resuming the connection. It is therefore necessary while imparting electric currents alternately to magnets (as before alluded to) to maintain a continuous communication or connection between the poles of the battery, and to carry out in practice this principle is the object of the second part of my invention, which consists in so introducing and cutting off the current of electricity to and from the several series of magnets that, while the magnets are successively energized at the proper times, communication between the poles of the battery is not interrupted, as will be hereinafter more fully explained.

It is well known that when a current of electricity is cut off from a conductor a secondary or induced current results.

The object of the third part of my invention is to utilize this secondary or induced current by directing it from the wire of one series of magnets which have just given their best force (and at the instant of cutting off) into the wire of another series of magnets, (with the battery current,) which at that instant are in a position to give their greatest power; and to this end my invention consists in conveying the secondary current derived from withdrawing the electric current from the wire of one set of magnets into the current supplying another set of magnets, as will be presently more fully explained.

The fourth part of my invention consists in a novel means of varying or regulating the times of applying to and cutting off from the magnets the electric currents for the purpose of governing and changing the speed and draft of the engine, as will be presently more fully described.

To enable those skilled in the art to practice my invention, I will proceed to describe the construction and operation of a magnetic engine, such as I have built and successfully operated, embodying the several features of my invention, referring by letters to the accompanying drawings, in which—

Figure 1 is a top view of the engine; Fig. 2, a vertical cross-section at line $x$ $x$, Fig. 1; Fig. 3, a similar section at the line $y$ $y$, Fig. 1; Fig. 4, a longitudinal section at $z$ $z$, Fig. 1; Fig. 5, an end view, and Fig. 6 a detail view.

In the several figures the same parts will be found designated by the same letters of reference.

A is the frame of the machine, which may be rectangular in shape, as shown, of suitable strength, and designed to sustain the other parts of the machine, as shown. The side is of wrought-iron, and the ends may be of cast-iron or other suitable material.

To the inner faces of the opposite sides of the frame A of the machines is secured in pairs opposite to each other a series of electro-magnets B B C C, &c., and on a central rotatory shaft H, which is mounted to turn freely in suitable bearings in the frame A, is mounted (also in pairs) a series of radially-arranged magnets I I J J, &c.

The electro-magnets are all made up, in the usual manner, after the fashion of horseshoe electro-magnets, and their coils are all supplied with the electric current (from a battery) through the medium of two wheels $a$ $b$, mounted on the shaft H, (and turning with it,) the faces of which run in contact with the conductors $e$ $f$ $g$ $h$. Each of these wheels $a$ $b$ is made of three distinct parts-1 2 3, as shown at Fig. 6, and so put together that each part is insulated from the others, and from each of these parts passes an insulated wire $l$ $m$ $n$, &c., each supplying one pair of the rotating magnets, those passing from the several parts of wheel $a$ connecting with magnets I, J, and K, and those running from wheel $b$ supplying magnets L M N. The returning wire $p$ $q$ $r$, &c., from each of the said magnets connects with one of a series of insulated collars $w$ $w'$ $w^2$, &c., also secured on the shaft H, and in contact with these collars rests a series of conductors $x$ $x'$ $x^2$, &c., through which the electric currents are conveyed to the wires $y$ $y'$ $y^2$, &c., which supply the stationary magnets. The several magnets of each set of said stationary magnets are connected by a wire $o$, (see Fig. 2,) which passes along under the machine, as illustrated. $c'$ $c^2$ $c^3$, &c., are the return-wires from the stationary magnets, which all connect with two conductors $g$ and $h$ in a manner to operate, as I shall presently explain. I have said that each of the wheels $a$ $b$ supplied three of the double rotatory magnets I I J J, &c., and that the return-wires of stationary magnets connected with two different conductors $g$ and $h$.

The conductors $e$ and $f$ convey the current from the battery to the several series of magnets. The conductors $g$ and $h$ act as a cut-off. Their relative position to the other conductors determines when any series of magnets shall be demagnetized, and they also serve to convey the return or secondary or induced current from either series of magnets which may have been just cut off into the series of magnets which at that instant are already under the full action of the battery and in a position to give their best power; and this secondary current goes in the same direction and with the current from the battery, adding a momentary intensity to its action and a corresponding impulse to the engine. These conductors $e$ $f$ and $g$ $h$ are secured by set-screws in studs $o^2$ $o^3$, projecting from an adjustable disk $B^3$, which is arranged to turn (concentrically with the shaft H) in its bearings at $s$ $s$, (see Fig. 5;) and these studs $o^2$ $o^3$ are adjustable, so that the distance between the ends of the two sets of conductors may be varied, for purposes to be presently explained.

In connection with what I have already said relative to the several parts of the machine or apparatus and their arrangement together, I think the following explanation will suffice to impart a complete knowledge of the operation of the engine and working of the several features of my invention.

Connection being made between the wire T and one of the poles of a battery, a current of electricity passes through the conductor e to that one of the three parts composing wheel a, which happens to be immediately under and in contact with the lower end of said conductor, and energizes the particular pair of rotary magnets connected with said part of wheel a. The current, passing around said magnets, returns to a particular one of the collars on shaft H, and thence to the set of stationary magnets which operate in conjunction with said rotary magnets, and thence back through one of the wires passing to conductor g. Supposing, now, that the first double magnet I and its mates are in operation by this current as the magnets vibrate toward their dead-center, turning the shaft H and all its appendages, that portion of wheel a which is in contact with the conductor e runs out of contact and another comes under said conductor to carry off the current to another set of movable magnets; but as the magnets I are moving and the current which energizes them is traveling, as just explained, to conductor g it passes on (in lieu of back to the battery) to the conductor f, and thence to one of the parts of wheel b, which connects with the magnets L and their mates, which are just now coming into position to be effective, and thence through conductor h and wire V to the battery. Before the series of magnets I have arrived at their dead-center, but have so far completed their movement toward that point as to cease to be very effective in their action in the line of motion, the series of magnets L have arrived at the position to give their most effective power. At that instant the cut-off g comes into action, the conductors e and g, both bearing upon the same flange of one section of the triple-wheel a, permits the current to run from conductor e directly to conductor g and from thence to conductor f without going around the series of magnets I, giving time to demagnetize this series before it arrives at its dead-center, so that it may be free to pass on, and the moment the current is thus cut off from the series of magnets I the secondary or induced current from this series of magnets enters conductor g, and from thence into conductor f, with which it is connected, and this induced current running thence with the battery-current serves to give increased vigor to the series of magnets L at the moment when they are in a position to give their most effective force; and this, with each series of magnets, as the the triple wheels a and b, with their appendages, rotate under the conductors each series of magnets is magnetized and demagnetized in succession to keep the machine in continued motion.

I have colored the parts which are in connection with each other when the current is supplied to any given part of either of the wheels a b the same in the drawings, in order that the courses of the currents may be more readily traced.

With the magnets arranged as shown they would be energized in the following order: first, those marked I, (and their stationary mates,) then L, then J, then M, then K, then N, and so on, in the same order over and over again.

If the conductor e were taken out of contact with one part of wheel a and then put in contact with another, the circuit would of course be broken, no matter how rapidly the transition from one contact to the other might be effected; but I make the several parts of each wheel so that they come together at a line running obliquely across the periphery or face of said wheel, and I make the bearing or line of contact of the end of each conductor e f, &c., straight across said periphery, so that the said conductor will be in contact really with two parts at once of said wheels as the joint between said parts passes along under said conductor. In this way I am enabled to transfer the current through the conductor e into two different parts of wheel a in succession without breaking the connection. It will be seen from this mode of operation that upon the relative position of the two sets of conductors—that is, their distance apart where they touch the faces of wheels a b—will depend upon the length of time that each set of magnets will be energized, and consequently the draft and velocity of the machine to a certain extent, for if the current be withdrawn soon after the poles begin to approach each other and when the magnets are capable of exerting their greatest force and another set then comes into operation it is evident that the machine will run rapidly; but the velocity and draft of the machine depends also on the regulation of the point or time at which the magnets shall be energized, and this is accomplished by the adjustment of the disk $B^3$, whereby the relative position of the conductors (supplying the currents) with the wheels a b is determined, and consequently the time of energizing the magnets.

If the magnets be energized before their poles begin to get opposite each other and at the time when they are most effective, of course the speed and draft of the machine will be very different from what they will be if the magnets be energized at other points of time during their motions toward each other.

Having explained my invention so that those skilled in the art can make and use my invention, what I claim as new, and desire to secure by Letters Patent, is—

1. In the employment of a series of rotatory magnets arranged in pairs and so connected that the magnetization of one set of magnets is effected before the magnetization of the others, substantially as and for the purpose as described, in combination with a series of stationary magnets when arranged and operating in the manner substantially as hereinbefore described, for the purpose set forth.

2. Alternately energizing and demagnetizing the electro-magnets without breaking the connection between the poles of the battery, in the manner hereinbefore described.

3. Conveying the induced or secondary current from the magnet as they are demagnetized, along with the current running to supply another set of magnets, substantially in the manner herein described, for the purpose set forth.

4. The employment of a series of adjustable conductors, substantially as described, whereby the speed and draft of the engine may be governed at pleasure, as hereinbefore set forth.

5. The combination of the disks $a$ and $b$, and the conductors $e$, $f$, $g$, and $h$, when arranged and operating substantially as described.

In testimony whereof I have hereunto set my hand and seal this 24th day of December, 1867.

L. C. STUART. [L. S.]

In presence of—
C. A. SCOTT,
WM. H. BISHOP.